United States Patent
Singh et al.

(10) Patent No.: US 9,538,435 B1
(45) Date of Patent: Jan. 3, 2017

(54) VOLTE PACKET DELAY BASED NETWORK CONFIGURATION

(71) Applicant: SPRINT COMMUNICATIONS COMPANY L.P., Overland Park, KS (US)

(72) Inventors: Jasinder P. Singh, Olathe, KS (US); Maulik K. Shah, Overland Park, KS (US); Siddharth S. Oroskar, Overland Park, KS (US); Anoop Kumar Goyal, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 132 days.

(21) Appl. No.: 13/682,089

(22) Filed: Nov. 20, 2012

(51) Int. Cl.
*H04W 4/00* (2009.01)
*H04W 36/00* (2009.01)
*H04W 72/04* (2009.01)
*H04L 12/801* (2013.01)

(52) U.S. Cl.
CPC ......... *H04W 36/0088* (2013.01); *H04W 72/04* (2013.01); *H04L 47/10* (2013.01)

(58) Field of Classification Search
CPC .. H04W 72/04; H04W 72/0486; H04W 28/20; H04W 48/10; H04W 28/02; H04W 28/10; H04W 36/0088; H04L 47/10; H04L 47/2416; H04L 47/14; H04L 1/0001; H04L 1/0003; H04L 1/0009; H04L 1/00; H04L 47/56; H04L 47/17
USPC ............. 370/230, 235, 331, 329, 230.1, 352
See application file for complete search history.

(56) References Cited

U.S. PATENT DOCUMENTS

| | | | |
|---|---|---|---|
| 8,521,141 B2* | 8/2013 | Aguirre et al. ............ | 455/414.1 |
| 2007/0202878 A1* | 8/2007 | Choi et al. .................... | 455/436 |
| 2011/0292797 A1* | 12/2011 | Bejerano ................. | H04L 12/66 370/230.1 |
| 2012/0039169 A1* | 2/2012 | Susitaival et al. ........... | 370/230 |
| 2012/0281536 A1* | 11/2012 | Gell et al. ..................... | 370/235 |
| 2013/0195077 A1* | 8/2013 | Ohta ............................. | 370/331 |

* cited by examiner

*Primary Examiner* — Kwang B Yao
*Assistant Examiner* — Syed M Bokhari

(57) ABSTRACT

Systems, methods, and computer-readable media for dynamically configuring VoLTE packet delay are provided. In embodiments, the method includes providing an initial packet delay for a connection between mobile devices associated with one or more base stations. The packet delay may be based on historical data, transporting media, and a number of hops between originating and receiving devices. Real-time data associated with the one or more base stations is received. In embodiments, the real-time data includes latency, capacity of the scheduler, and data associated with handoffs. The packet delay is dynamically configured to adjust for the real-time data.

16 Claims, 3 Drawing Sheets

VOLTE PACKET DELAY BASED NETWORK CONFIGURATION

SUMMARY

A high-level overview of various aspects of the invention is provided here for that reason, to provide an overview of the disclosure, and to introduce a selection of concepts that are further described in the detailed-description section below. This summary is not intended to identify key features nor essential features of the claimed subject matter, nor is it intended to be used as an aid in isolation to determine the scope of the claimed subject matter. In brief, and at a high level, this disclosure describes, among other things, performing a method of dynamically configuring Voice on Long Term Evolution (VoLTE) packet delay. In embodiments, packet delay is provided for a connection between mobile devices associated with one or more base stations. In embodiments, real-time data associated with the connection is received. The real-time data includes the latency of the transporting media provided by the base stations. In embodiments, the packet delay is adjusted based on the real-time data.

BRIEF DESCRIPTION OF THE SEVERAL VIEWS OF THE DRAWINGS

Illustrative embodiments of the present invention are described in detail below with reference to the attached drawing figures, and wherein.

DETAILED DESCRIPTION

Figure 1:
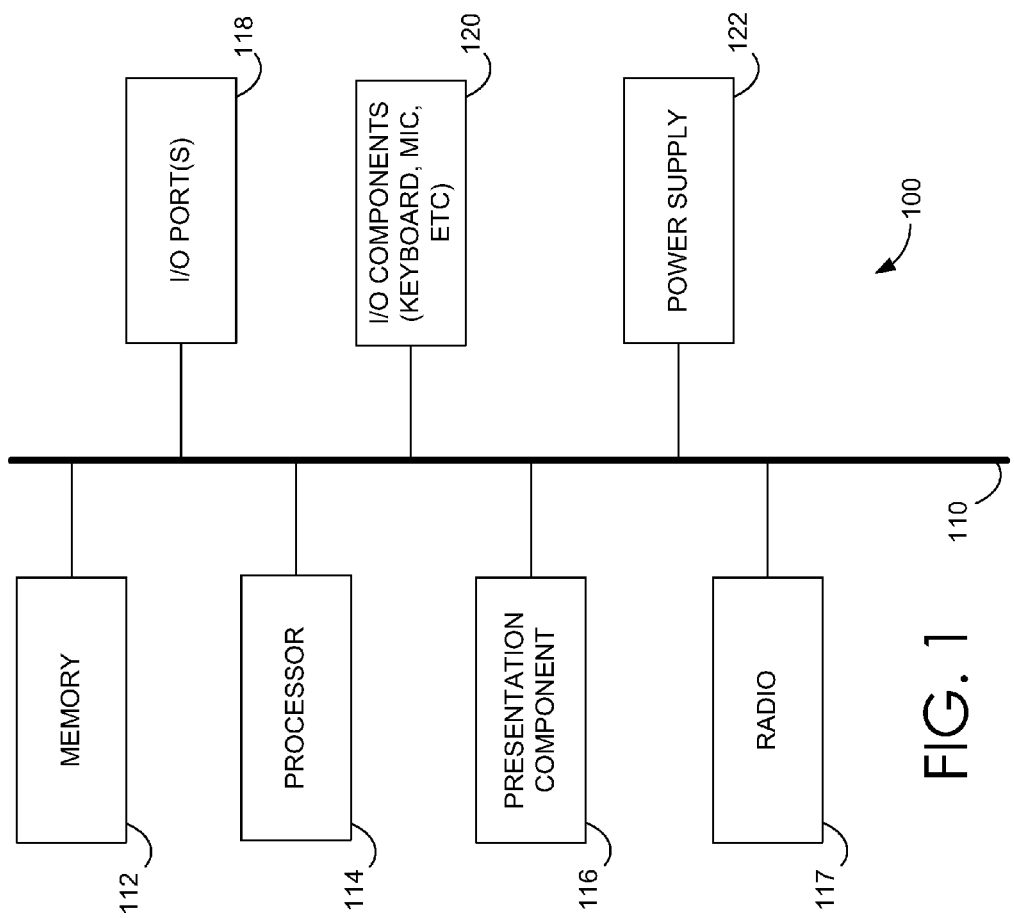
FIG. 1 depicts an illustrative device suitable for use in connection with embodiments of the invention.

The subject matter of the present invention is described with specificity herein to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of the methods employed, the terms should not be interpreted as implying any particular order among or between various steps herein disclosed unless and except when the order of individual steps is explicitly described.

In LTE networks, voice packets are buffered and scheduled after a configured duration of time. Currently in LTE networks, the delay is a fixed value of duration between two voice packets irrespective of mouth to ear (i.e., originating device to terminating device) latency. The delay is set so that it is neither too low to impact the capacity of other applications nor too high that the voice packets are delayed even when there is sufficient capacity available, or worse, the delay is perceivable to a user. Confounding the issue further, latency varies not only based on the number of hops between mouth and ear, but also based on the media used to transport the packets (e.g., microwave, Ethernet, etc.). When a user roams from one base station to another, the likelihood that the fixed delay is improperly set is even greater.

Embodiments of the present invention are directed to dynamically configuring VoLTE packet delay. In embodiments, packet delay is initially set to an assumed value based on transporting media associated with base stations providing a connection. In embodiments, real-time data associated with each base station providing the connection, including handoffs, is received. In embodiments, the packet delay is adjusted based on the real-time data and/or a capacity associated with a scheduler.

Accordingly, in one aspect, embodiments of the present invention are directed to one or more computer storage media having computer-executable instructions embodied thereon that, when executed, perform a method of dynamically configuring VoLTE packet delay. The method includes determining, at a scheduler, an assumed packet delay for a connection based on transporting media associated with one or more base stations providing the connection. A packet delay is set to the assumed packet delay. Real-time data associated with a latency of the transporting media is received. The packet delay is dynamically configured to adjust for the real-time data and a capacity associated with the scheduler.

In another aspect, embodiments of the present invention are directed to one or more computer storage media having computer-executable instructions embodied thereon that, when executed, perform a method of dynamically configuring VoLTE packet delay. The method includes providing an initial packet delay for a connection between a plurality of mobile devices associated with one or more base stations. An indication that the connection for at least one of the plurality of mobile devices is handed off to a handoff base station is received. Real-time data associated with the connection is received. The initial packet delay is dynamically configured based on the real-time data.

In yet another aspect, embodiments of the present invention are directed to a system for dynamically configuring VoLTE packet delay. The system includes a scheduler for providing a packet delay for a connection between a plurality of mobile devices associated with one or more base stations. A real-time data component receives real-time data associated with the connection. A dynamic component dynamically configures the packet delay based on the real-time data and communicates the packet delay to the scheduler.

Throughout the description of embodiments of the present invention, several acronyms and shorthand notations are used to aid the understanding of certain concepts pertaining to the associated methods, systems, and computer-readable media. These acronyms and shorthand notations are solely intended for the purpose of providing an easy methodology of communicating the ideas expressed herein and are in no way meant to limit the scope of the present invention. The following is a list of these acronyms:

| | |
|---|---|
| 3G | Third-Generation Wireless Telephone Technology |
| 4G | Fourth-Generation Wireless Telephone Technology |
| CDMA | Code Division Multiple Access |
| CD-ROM | Compact Disk Read Only Memory |
| CRM | Customer Relations Management |
| DVD | Digital Versatile Discs |

| | |
|---|---|
| EEPROM | Electrically Erasable Programmable Read Only Memory |
| ENODEB | Evolved Node B |
| GPRS | General Packet Radio Service |
| GPS | Global Positioning System |
| GSM | Global System for Mobile Communications |
| HLR | Home Location Register |
| iDEN | Integrated Digital Enhanced Network |
| LTE | Long Term Evolution |
| MSC | Mobile Serving Center |
| MMS | Multimedia Messaging Service |
| PC | Personal Computer |
| PCS | Personal Communications Service |
| PDA | Personal Digital Assistant |
| PLMN | Public Land Mobile Network |
| RAM | Random Access Memory |
| RF | Radio Frequency |
| ROM | Read Only Memory |
| SIB2 | SystemInformationBlockType2 |
| SLA | Service Level Agreement |
| SMS | Short Message Service |
| TDMA | Time Division Multiple Access |
| UMTS | Universal Mobile Telecommunications Systems |
| VoIP | Voice over IP |
| Wi-Fi | Wireless Fidelity |
| WiMAX | Worldwide Interoperability for Microwave Access |

Further, various technical terms are used throughout this description. An illustrative resource that fleshes out various aspects of these terms can be found in Newton's Telecom Dictionary, 25th Edition (2009).

Embodiments of the present invention can take the form of a method, system, or computer-readable media embodied with a specific set of computer-executable instructions. Computer-readable media include both volatile and nonvolatile media, removable and nonremovable media, and contemplate media readable by a database, a switch, and various other network and computing devices. Computer-readable media include media implemented in any method or technology that stores information. Examples of stored information include computer-useable instructions, data structures, program modules, and other data representations. Examples of computer-readable media include RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. The computer-readable media can store data momentarily, temporarily, or permanently.

Turning now to FIG. 1, a block diagram of an illustrative mobile computing device ("mobile device") is provided and referenced generally by the numeral 100. Although some components are shown in the singular, they may be plural. For example, mobile device 100 might include multiple processors or multiple radios, etc. As illustratively shown, mobile device 100 includes a bus 110 that directly or indirectly couples various components together including memory 112, a processor 114, a presentation component 116, a radio 117, input/output ports 118, input/output components 120, and a power supply 122.

Memory 112 might take the form of one or more of the aforementioned media. Thus, we will not elaborate more here, only to say that memory component 112 can include any type of medium that is capable of storing information in a manner readable by a computing device. In one embodiment, memory 112 includes a set of embodied computer-executable instructions 113 that, when executed, facilitate various aspects disclosed herein. These embodied instructions will variously be referred to as "instructions 113" or "application 113" for short.

Processor 114 might actually be multiple processors that receive instructions 113 and process them accordingly. Presentation component 116 includes the likes of a display, a speaker, as well as other components that can present information (such as a lamp (LED), or even lighted keyboards).

Radio 117 represents a radio that facilitates communication with a wireless telecommunications network. Illustrative wireless telecommunications technologies include CDMA, GPRS, TDMA, GSM, and the like. Radio 117 might additionally or alternatively facilitate other types of wireless communications including Wi-Fi, WiMAX, LTE, or other VoIP communications. As can be appreciated, in various embodiments, radio 117 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

Input/output port 118 might take on a variety of forms. Illustrative input/output ports include a USB jack, stereo jack, infrared port, proprietary communications ports, and the like. Input/output components 120 include items such as keyboards, microphones, touch screens, and any other item usable to directly or indirectly input data into mobile device 100. Power supply 122 includes items such as batteries, fuel cells, or any other component that can act as a power source to power mobile device 100.

Figure 2:
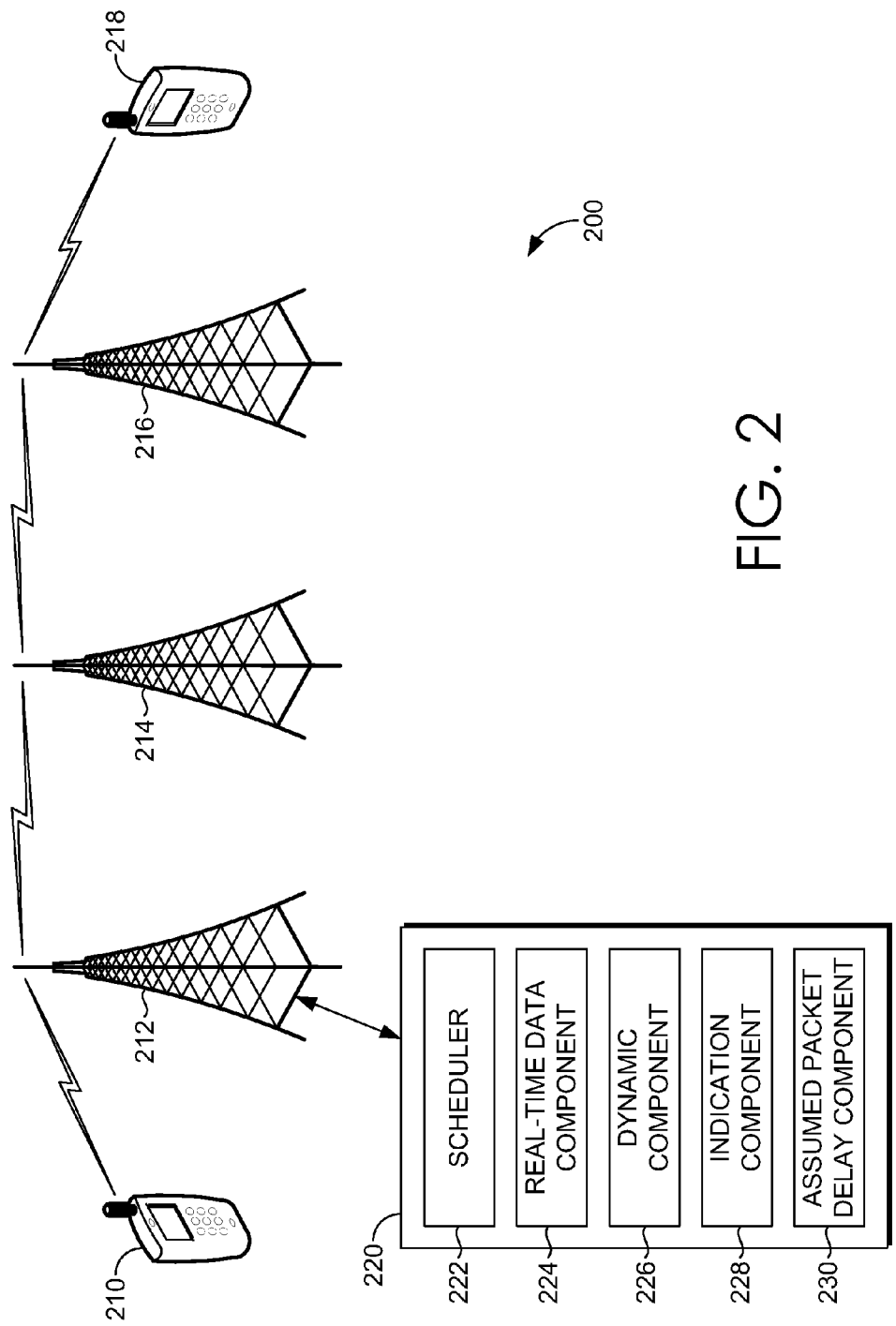
FIG. 2 is a schematic view of an exemplary network environment suitable for performing embodiments of the invention.

FIG. 2 provides an exemplary network environment suitable for use in implementing embodiments of the present invention. Such a network environment is illustrated and designated generally as network environment 200. Network environment 200 is but one example of a suitable network environment and is not intended to suggest any limitation as to the scope of use or functionality of the invention. Neither should the network environment be interpreted as having any dependency or requirement relating to any one or combination of components illustrated.

In the network environment 200, a user device 210 may communicate with other devices, such as mobile devices, servers, etc. The user device 210 may take on a variety of forms, such as a personal computer (PC), a laptop computer, a tablet, a netbook, a mobile phone, a Smart phone, a personal digital assistant (PDA), or any other device that is cable of communicating with other devices. For example, the user device 210 can take on any form, such as, for example, a mobile device or any other computing device capable of wirelessly communicating with the other devices using a network. Makers of illustrative devices include, for example, Research in Motion, Creative Technologies Corp., Samsung, Apple Computer, and the like. A device can include, for example, a display(s), a power source(s) (e.g., a battery), a data store(s), a speaker(s), memory, a buffer(s), and the like. In embodiments, a user device comprises a wireless or mobile device with which a wireless telecommunication network(s) can be utilized for communication (e.g., voice and/or data communication). In this regard, the user device can be any mobile computing device that communicates by way of, for example, a 3G or 4G network.

The user device 220 can utilize a network to communicate with other computing devices (e.g., a mobile device(s), a server(s), a personal computer(s), etc.). In embodiments, the network is a telecommunications network(s), or a portion thereof. A telecommunications network might include an array of devices or components (e.g., base stations 212, 214, 216), some of which are not shown so as to not obscure more relevant aspects of the invention. Components such as terminals, links, and nodes (as well as other components) can provide connectivity in some embodiments. The network can include multiple networks, as well as being a network of networks, but is shown in more simple form so as to not obscure other aspects of the present invention. The network can be part of a telecommunication network that connects subscribers to their immediate service provider. In embodiments, the network can be associated with a telecommunications provider that provides services (e.g., LTE) to user devices, such as user device 210. For example, the network may provide voice services to user devices or corresponding users that are registered or subscribed to utilize the services (e.g., LTE) provided by a telecommunications provider. The network can be any communication network providing voice and/or data service(s), such as, for example, a 1× circuit voice, a 3G network (e.g., CDMA, CDMA2000, WCDMA, GSM, UMTS), or a 4G network (WiMAX, LTE, HSDPA).

In LTE networks, voice packets are buffered and scheduled after a configured duration of time. Currently in LTE networks, the delay is a fixed value of duration between two voice packets irrespective of mouth to ear (i.e., originating device to terminating device) latency. The delay is set so that it is neither too low to impact the capacity of other applications nor too high that the voice packets are delayed even when there is sufficient capacity available, or worse, the delay is perceivable to a user. Confounding the issue further, latency varies not only based on the number of hops between mouth and ear, but also based on the media used to transport the packets (e.g., microwave, Ethernet, etc.). When a user roams from one base station to another, the likelihood that the fixed delay is improperly set is even greater.

In implementation, base stations 212, 214, 216 are associated with components 220 that are utilized, in various embodiments, to dynamically configure VoLTE packet delay to account for real-time data associated with latency based on the number of hops, the transport media, and handoffs. The components 220, in various embodiments, include scheduler 222, real-time data component 224, dynamic component 226, indication component 228, and assumed packed delay component 230.

Scheduler 222 provides a packet delay for a connection between a plurality of mobile devices 210, 218 associated with one or more base stations 212, 214, 216. The packet delay is a specific delay that buffers VoLTE packets until the delay is met. Once the delay is met, the VoLTE packets are transmitted. As can be appreciated, any number of base stations may be involved in providing a connection between mobile devices. Further, as a user utilizing a mobile device moves from one location to another, the connection may be handed off to additional base stations.

In one embodiment, an assumed packet delay component 230 determines an assumed packet delay based on the connection. The assumed packet delay is communicated to the scheduler 222 and utilized as the packet delay until real-time data component 222 receives real-time data and dynamic component 226 dynamically configures the packet delay. In one embodiment, the assumed packet delay is based on historical data associated with the one or more base stations 212, 214, 216. In another embodiment, the assumed packet delay based on the transport media associated with the one or more base stations 212, 214, 216.

Real-time data component 224 receives real-time data associated with the connection. In one embodiment, the real-time data includes a latency associated with the connection. In one embodiment, the latency is associated with a number of hops in the connection. In another embodiment, the real-time data includes a capacity associated with the scheduler.

Dynamic component 226 dynamically configures the packet delay based on the real-time data. As noted above, the real-time data may include latency associated with the connection, capacity associated with the schedule, or both.

In another embodiment, the real-time data includes data related to handoffs. For example, a handoff may occur during a connection due to a user changing locations. In one embodiment, indication component 228 receives an indication that the connection for at least one of the plurality of mobile devices is handed off to a handoff base station. The handoff results in a change in the base stations associated with the connection. The change may be that additional or fewer base stations are required to make the connection. Or the change may simply be that different base stations are involved in making the connection. Accordingly, real-time data component 224 receives real-time data associated with the base stations involved in making the connection, such as latency described above. Dynamic component 226 dynamically configures the packet delay based on changes in the latency that may be realized (as real-time data is received by real-time data component 224) during such a handoff.

Figures 3, 4:
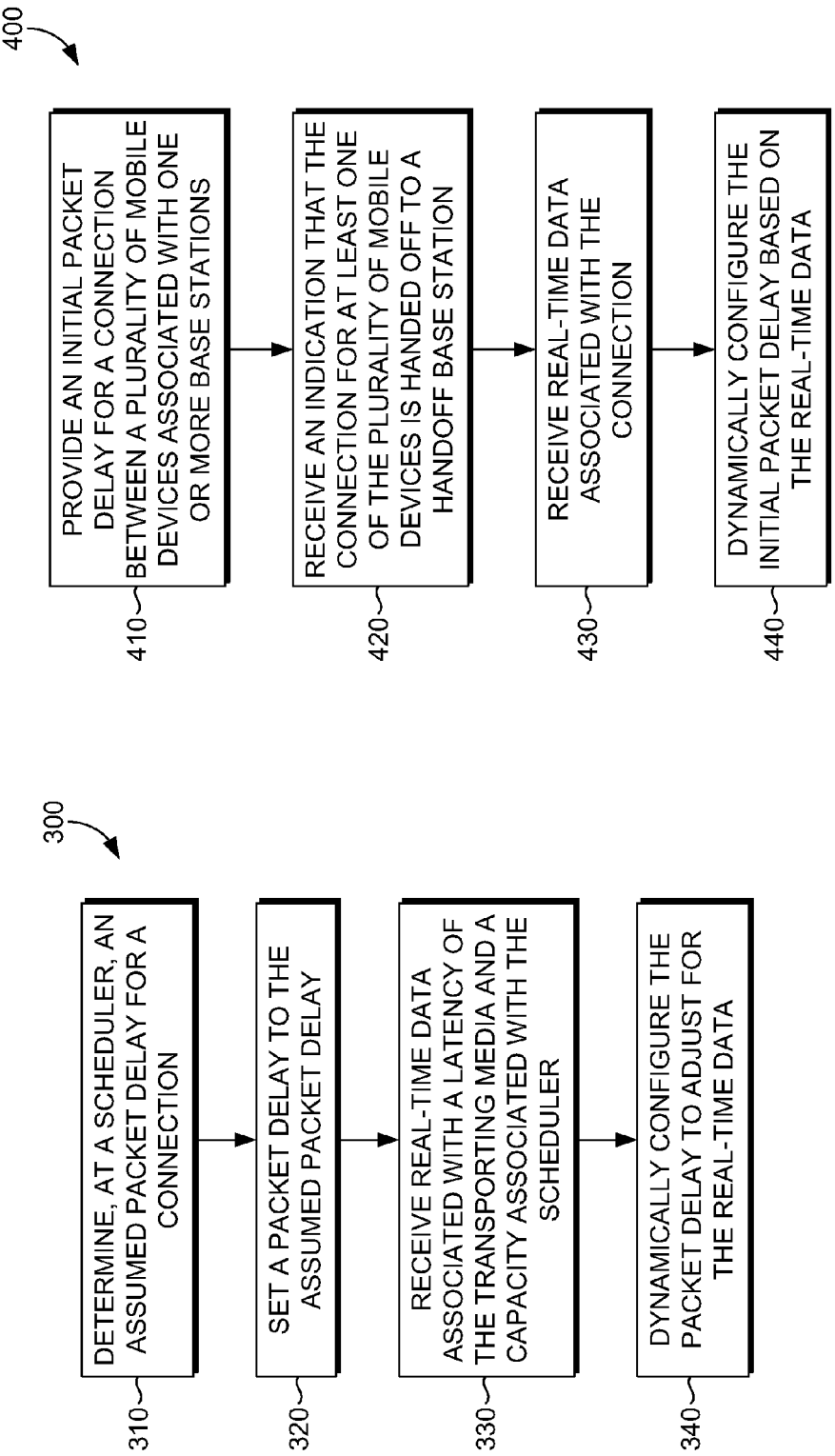
FIG. 3 is a flow diagram depicting an illustrative method of dynamically configuring VoLTE packet delay, in accordance with embodiments of the invention.
FIG. 4 is a flow diagram depicting an illustrative method of dynamically configuring VoLTE packet delay, in accordance with embodiments of the invention.

Referring now to FIG. 3, a flow diagram depicts a method 300 of dynamically configuring VoLTE packet delay, in accordance with embodiments of the invention. At step 310, an assumed packet delay for a connection is determined, at a scheduler, based on transporting media associated with one or more base stations providing the connection. For example, the transporting media may be microwave, Ethernet, and the like. As can be appreciated, the transporting media utilized by a particular base station may influence the latency associated with the connection. In one embodiment, the assumed packet delay is associated with historical data associated with the one or more base stations providing the connection. In one embodiment, the one or more base stations represent a network that provide the connection between a first mobile device associated with a first base station and a second mobile device associated with a second base station. In one embodiment, the connection is stationary. In other words, the first mobile device remains associated with the first base station and the second mobile device remains associated with the second station throughout the duration of the connection. In one embodiment, the connection for either the first mobile device or the second mobile device includes one or more handoffs to other base stations.

At step 320, the packet delay is set to the assumed packet delay. This allows the connection to be established utilizing the assumed packet delay as a starting point for the packet delay. Real-time data associated with a latency of the transporting media and a capacity associated with the scheduler is received at step 330. The real-time data represents actual latency associated with the connection. The capacity represents the real-time load of the scheduler. In one embodiment, the real-time data associated with the latency is based upon a number of hops for the connection. For example, in addition to latency associated with the transporting media, latency may further be influenced by the number of base stations (i.e., hops) necessary to establish the connection.

The packet delay is dynamically configured, at step 340, to adjust for the real-time data. Thus, the real-time data allows the VoLTE packets to be prioritized in a way that optimizes utilization of the base station without adversely impacting other applications or users. In one embodiment, the packet delay is further dynamically configured to adjust for the one or more handoffs.

Referring now to FIG. 4, a flow diagram depicts an illustrative method 400 of dynamically configuring VoLTE packet delay, in accordance with an embodiment of the present invention. Initially, at step 410, an initial packet delay is provided for a connection between a plurality of mobile devices associated with one or more base stations. In one embodiment, the connection includes hop base stations that assist the one or more base stations in providing the connection.

At step 420, an indication that the connection for at least one of the plurality of mobile devices is handed off to a handoff base station is received. This indicates that the mobile device is not stationary and has moved into an area associated with another base station. Accordingly, packet delay is no longer provided in association with the initial base station; rather, the packet delay is provided in association with the handoff base station.

Real-time data associated with the connection is received at step 430. In one embodiment, the real-time data includes a latency associated with the connection. In another embodiment, the real-time data includes a capacity for a scheduler associated with the one or more base stations. The capacity represents the current load of the scheduler. In one embodiment, the real-time data includes latency associated with the hop base stations. In other words, the real-time data includes latency associated with any base station necessary for providing the connection, including hop base stations and handoff base stations.

Many different arrangements of the various components depicted, as well as components not shown, are possible without departing from the scope of the claims below. Embodiments of our technology have been described with the intent to be illustrative rather than restrictive. Alternative means of implementing the aforementioned can be completed without departing from the scope of the claims below. Certain features and subcombinations are of utility and may be employed without reference to other features and subcombinations and are contemplated within the scope of the claims. For example, not all steps listed in the various figures need to be carried out in the specific order described.

The invention claimed is:

1. A non-transitory computer storage media having computer-executable instructions embodied thereon that, when executed by one or more processors, cause the one or more processors to perform a method of dynamically configuring Voice on Long Term Evolution "VoLTE" packet delay, the method comprising: determining, at an assumed packet delay component, an assumed packet delay for a connection based on transporting media associated with one or more base stations providing the connection; receiving, at a scheduler, the assumed packet delay for the a connection setting, at the scheduler, a VoLTE packet delay for the connection to the assumed packet delay; receiving, at a real-time data component, real-time data associated with a latency of the transporting media and a capacity associated with the scheduler; receiving, at an indication component, an indication that the connection is handed off to a handoff base station; and dynamically configuring, at a dynamic component, the VoLTE packet delay for the connection to adjust for the real-time data.

2. The media of claim 1, wherein the assumed packet delay is further based on historical data associated with the one or more base stations, and wherein the transporting media comprises at least one of ethernet and microwave.

3. The media of claim 1, further comprising receiving, at the real-time data component, real-time data associated with a latency based upon a number of hops for the connection.

4. The media of claim 1, wherein the one or more base stations represent a network that provide the connection between a first mobile device associated with a first base station and a second mobile device associated with a second base station.

5. The media of claim 4, wherein the connection is stationary.

6. The media of claim 4, wherein the connection for either the first mobile device or the second mobile device includes one or more handoffs to other base stations.

7. The media of claim 6, wherein the VoLTE packet delay is further dynamically configured to adjust for the one or more handoffs.

8. A non-transitory computer storage media having computer-executable instructions embodied thereon that, when executed, perform a method of dynamically configuring Voice on Long Term Evolution "VoLTE" packet delay, the method comprising: providing an initial VoLTE packet delay for a connection between a plurality of mobile devices associated with one or more base stations; determining, at an assumed packet delay component, an assumed packet delay for the connection based on transporting media associated with the one or more base stations; communicating, from the assumed packet delay component, the assumed packet delay to a scheduler; setting, at the scheduler, the initial VoLTE packet delay for the connection to the assumed packet delay; receiving, at an indication component, an indication that the connection for at least one of the plurality of mobile devices is handed off to a handoff base station; receiving, at a real-time data component, real-time data associated with the connection, the real-time data associated with a number of hops in the connection, a capacity associated with the scheduler, or data related to handoffs; and dynamically configuring, at a dynamic component, the assumed VoLTE packet delay for the connection based on the real-time data.

9. The media of claim 8, wherein the real-time data includes a latency associated with the connection.

10. The media of claim 8, wherein the real-time data includes a capacity for the scheduler.

11. The media of claim 8, wherein the connection includes hop base stations that assist the one or more base stations in providing the connection.

12. The media of claim 11, wherein the real-time data includes latency associated with the hop base stations.

13. The computer system of claim 12, wherein the real-time data includes a latency associated with the connection.

14. The computer system of claim 12, wherein the real-time data includes the capacity associated with the scheduler.

15. The computer system of claim 12, wherein the real-time data includes a latency associated with a number of hops in the connection.

16. A computer system for dynamically configuring Voice on Long Term Evolution "VoLTE" packet delay, the system comprising:

one or more processors coupled to a computer storage medium, the computer storage medium having stored thereon a plurality of computer software components executable by the one or more processors, the computer software components comprising:

a scheduler configured to provide a VoLTE packet delay for a connection between a plurality of mobile devices associated with one or more base stations;

an assumed packet delay component configured to determine an assumed pack delay and communicate the assumed packet delay to the scheduler;

an indication component configured to receive an indication that the connection for at least one of the plurality of mobile devices is handed off to a handoff base station;

a real-time data component configured to receive real-time data associated with the connection, the real-time data associated with a number of hops in the connection, a capacity associated with the scheduler, or data related to handoffs; and a dynamic component configured to dynamically configure the VoLTE packet delay for the connection based on the real-time data and communicate the dynamically configured VoLTE packet delay to the scheduler.

* * * * *